United States Patent Office.

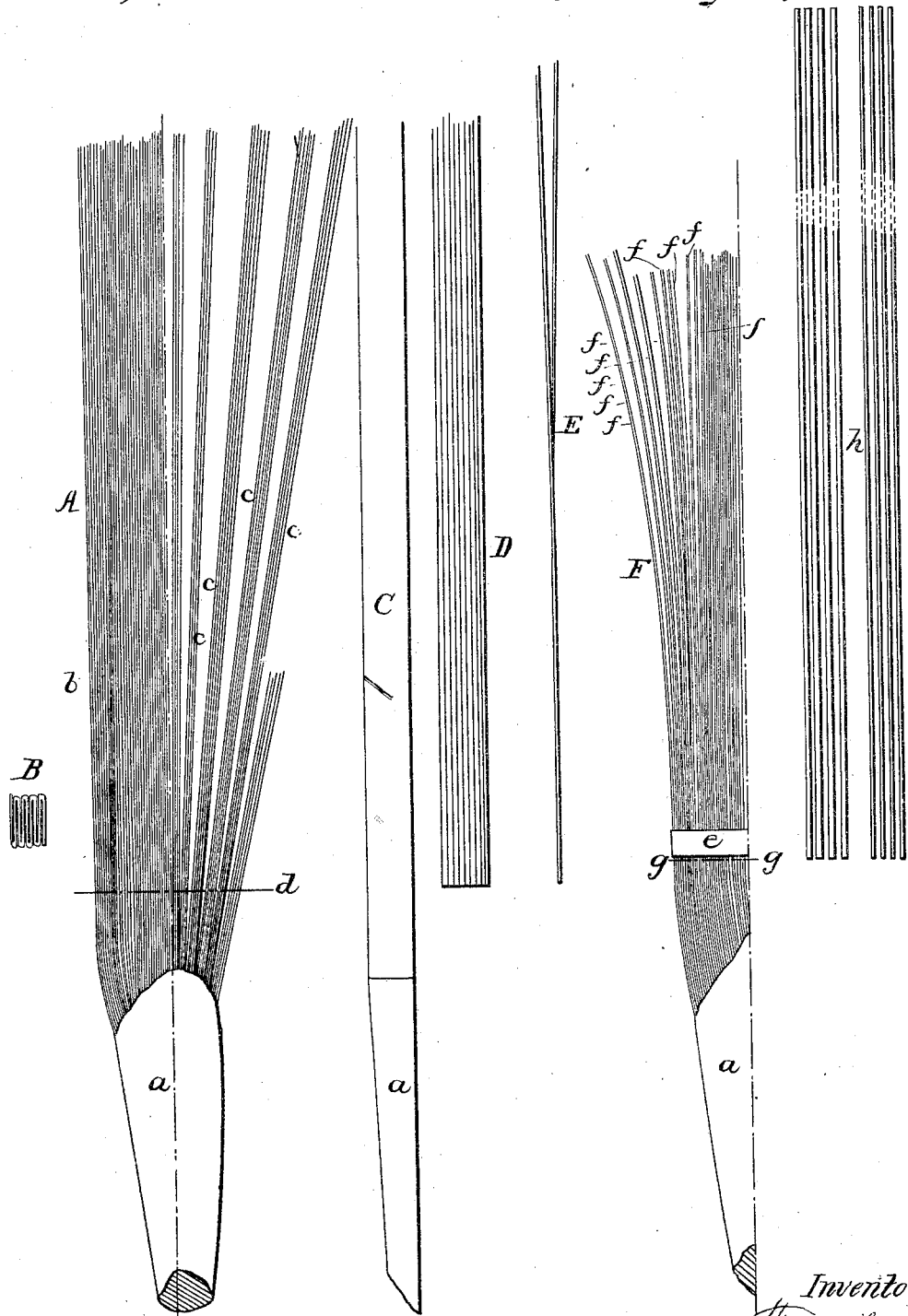

FRANKLIN PERRIN, OF CAMBRIDGE, MASSACHUSETTS.

Letters Patent No. 65,266, dated May 28, 1867.

---

IMPROVEMENT IN THE PREPARATION OF PALM-LEAF WARP AND WOOF FOR WEAVING.

---

The Schedule referred to in these Letters Patent and making part of the same.

---

TO ALL WHOM IT MAY CONCERN:

Be it known that I, FRANKLIN PERRIN, of Cambridge, in the county of Middlesex, and State of Massachusetts, have invented an Improvement in the Preparation of Palm-Leaf Warp and Woof for Weaving; and I do hereby declare that the following, taken in connection with the drawings, which accompany and form part of this specification, is a description of my invention sufficient to enable those skilled in the art to practise it.

The palm leaf of commerce, it is well known, consists of joined folds united throughout a considerable portion of their length at their edges, in the manner of the folds of a well-known variety of fan, and joined at one end to a stalk or butt common to all the folds. Heretofore, in preparing the leaf for braiding, and also for weaving, the practice has been to subdivide the leaf into sections composed of several folds, which sections were then divided into strips by drawing them over knives arranged like one row of the teeth of a hackle. This method of operation, it is obvious, left the strips which were formed at the edges of the sections double in thickness, or united at one edge, and in braiding said double strips were torn apart by the operatives with but little trouble; but in weaving, the operatives have to stop their looms whenever they find such united strips, and the consequence is delay and the production of inferior goods, the looms working best when run without stoppages.

In the practice of my invention I make use of a ligature around the folds of a leaf, or around the folds of each considerable section into which whole leaves may be divided for convenience, the ligature being located near the stem where that part of the leaf which is suitable for use terminates. The object of this ligature is to enable the operative, with ease and dispatch, to tear or split the natural joining of adjacent folds to a fixed and determined distance, beyond which, for a purpose yet to be referred to, the natural joining remains intact. Without employment of this ligature it will be obvious that each natural fold or joining could not be separated just to or substantially to the same line or plane, except by an expenditure of time and care which in practice would not be easily attained, and could not be allowed.

When the joinings at the edges of each fold in the leaf or section about which the ligature is put are split or torn thereto, then the butt or stem is severed close to that edge of the ligature which is most remote from the tip of the leaf. Then the ligature is removed, and the leaf or its large sections are divided into smaller sections containing as many of the divided folds as can well be split into strips on the knives before mentioned, all parts of these smaller sections being held together by the junction at the edges of the folds which were not torn or severed by reason of the protection afforded by the ligature; after each of these small sections has been divided into narrow strips of the right width for weaving, these short lengths of junctions are removed by severing from the bundle of strips into which the small section is now formed a length equal to the width of the ligature, so that in said bundle there remain no two strips united by the natural joining, and the attention of a weaver of these strips can be given uninterruptedly to the care of the loom.

To conduce to the better understanding of my invention, reference may be had to the accompanying drawing, in which A shows the leaf as imported, a denoting the butt or stem, having the leaf b extending therefrom, said leaf being composed of layers of substantially even width joined at the edges to the adjacent layers, as seen in section at B; but as they are thus joined from the butt outward through part of their length only, they appear in edge view somewhat as seen at E, a side view of each layer being about as seen at C. The divisions c represent the small sections formed in the old process by splitting a few of the natural joinings down to the butt, from which they are severed on the line d. In this old process, it will be remembered that when each section c is split into strips, as seen at D, there will be as many narrow double strips joined at one edge, as there are layers composing the folds of the sections. But in my method or process I take the leaf or a large section of a leaf, as seen at F; having passed a ligature, preferably of rubber, over the folds near the butt, I split each and every fold from the commencement of its joining down to the ligature seen at e, the separated layers being as seen at f, leaving no union whatever down to the ligature. When all of the layers are thus separated, I remove the ligature, having first cut off the butt on the line g g. Then I take a sufficient number of layers from the lot which was encompassed by the ligature, and pass them through the splitting knives, the slight union at the butt parts of these layers serving to keep them in proper relation to each other, and in parallelism, after which I cut off from the butt ends that part which was covered by the ligature. By a subsequent selecting or sorting process, the narrow strips are assembled into bundles of uniform length, as seen at h.

I claim the employment of a ligature in the preparation of palm-leaf strips, substantially as set forth.

FRANKLIN PERRIN.

Witnesses:
FRANCIS GOULD.
S. B. KIDDER.